United States Patent [19]

Goodman et al.

[11] Patent Number: 4,651,323
[45] Date of Patent: Mar. 17, 1987

[54] FAULT PROTECTION FLIP FLOP

[75] Inventors: William R. Goodman, Palo Alto; Kenneth G. Koenig, Campbell, both of Calif.

[73] Assignee: Tandem Computers Incorporated, Cupertino, Calif.

[21] Appl. No.: 551,302

[22] Filed: Nov. 14, 1983

[51] Int. Cl.⁴ .............................................. G06F 11/00
[52] U.S. Cl. ...................................... 371/60; 364/900
[58] Field of Search ................. 371/60, 51; 364/200, 364/900

[56] References Cited

U.S. PATENT DOCUMENTS

| | | | |
|---|---|---|---|
| 3,906,460 | 9/1975 | Halpern | 364/900 |
| 4,285,050 | 8/1981 | Muller | 364/900 |
| 4,388,695 | 6/1983 | Heinemann | 364/900 |
| 4,430,709 | 2/1984 | Schleupen | 364/200 |

Primary Examiner—Charles E. Atkinson
Attorney, Agent, or Firm—Townsend and Townsend

[57] ABSTRACT

The disclosure relates to the use of a flip flop or the like to provide additional protection against the destruction of data located in microprocessor system support circuits.

1 Claim, 1 Drawing Figure

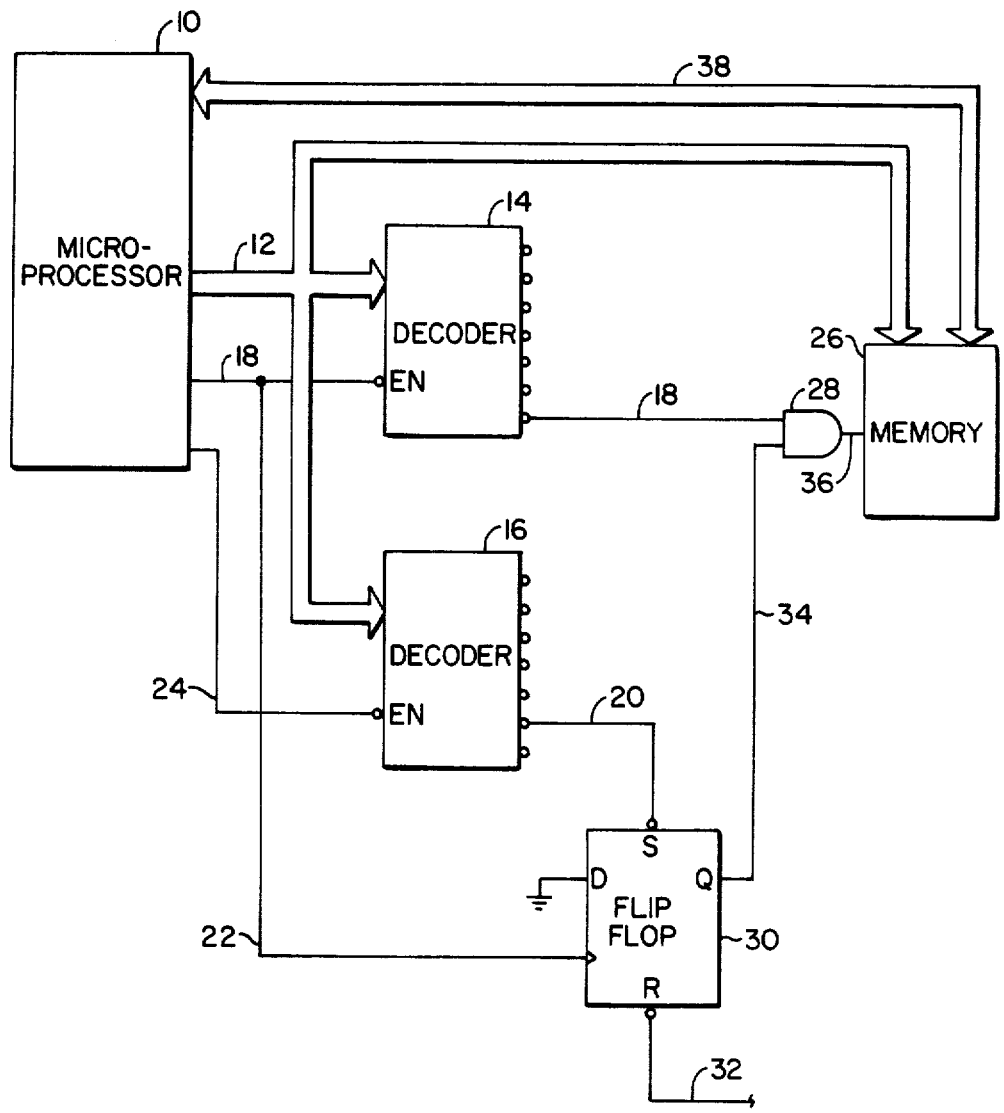

FAULT PROTECTION FLIP FLOP

BACKGROUND OF THE INVENTION

The present invention relates to microprocessor systems. A microprocessor system operates under microcode control. The microprocessor system is aided by various support circuits, e.g., memory, timers and registers, to perform predetermined tasks and the microprocessor controls the support circuits through electrical connections. The logical steps executed by the microprocessor cause the support circuits to obtain particular electronic states. In the event of a microprocessor failure, the support circuits can be erroneously affected and enter an erroneous electronic state. Protection of memory elements in the support circuits is important in recovery from failures or determining the type of failure. A disadvantage of microprocessor systems is the inability to protect the electronic state of support circuits from errors caused by a failing microprocessor.

SUMMARY

An object of the present invention is to protect support circuits. Adding a logic latch, such as a flip flop, between a microprocessor and support circuits protects the support circuits. The microprocessor can affect both the latch and the support circuits but cannot affect the support circuits without first affecting the logic latch. The logic latch enables the support circuits to be affected by the microprocessor. Thus, the microprocessor must correctly execute a sequence of code in the proper order to affect the support circuits. The microprocessor must first arm, i.e., set the latch, and then affect the support circuits. The proper sequence will not occur during common failure modes of the microprocessor. Consequently, the microprocessor will not be able to erroneously affect the support circuits during common failure modes of the microprocessor. This inability then provides the support circuits protection from a failing microprocessor. Connecting communication paths can be used by remote intelligent devices to interrogate the support circuits. Remote intelligent devices can then determine the electronic state of the support circuits. Diagnostic and maintainability functions are enhanced by remote intelligent interrogations. This protection is particularly applicable to critical stored information that should not be erroneously written over by the micropcocessor.

DRAWING DESCRIPTION

The drawing is a schematic diagram in which a flip flop is used to enable the writing of a memory element.

PREFERRED EMBODIMENT

Referring to FIG. 1, a microprocessor 10 uses address lines 12 for data communication. The address lines 12 are connected to address decoders 14 and 16. The address decoders 14 and 16 decode addresses on the address lines 12. The address selecting the output of the decoder 14 on a line 18 is different from the address selecting the output of the decoder 16 on a line 20. The decoders 14 and 16 have active low outputs and are enabled by the microprocessor 10.

The microprocessor 10 also has a control write output on a line 22 and a control read output on a line 24. The write control output on line 22 and read control output on line 24 are active low outputs. The write control output on line 22 enables the write decoder 14, and the read control output on line 24 enables the read decoder 16. The write decoder 14 has an active low control output on line 18, and this control line is used to enable a memory element 26. A flip flop 30 is used to protect the memory element 26. A support circuit which is here the memory element 26, has defined states. An enabling gate 28 enables the control output from the decoder 14 on line 18 to enable the memory element 26. The read decoder 16 has an active low control output on line 20. The control output on line 20 is used to set, and thus arm, the flip flop 30. The microprocessor 10 thus uses the read decoder 16 to set the flip flop 30.

The microprocessor 10 must execute a proper sequence of instructions to successfully write into the memory element 26. Upon initialization of the system, a power-on-reset signal is supplied on a line 32. The power-on-reset signal causes the flip flop 30 to be reset. The Q output of the flip flop 30 on line 34 will then be in an inactive normally low voltage state. The Q output on line 34 of the flip flop 30 then transmits a signal to the enabling gate 28. The enabling gate 28, in response to the control output on line 18, provides an enable signal on line 36 connected to the memory element 26. The enable output on line 36 enables data to be written into the memory element 26. When the Q output on line 34 of the flip flop 30 is in a low state, the enabling gate 28 disables the control output on line 18 from being presented on line 36 as an enable signal to the memory element 26.

The microprocessor 10 must first set the flip flop 30 to enable the memory element 26 to be written into. The microprocessor 10 causes the read control signal on line 24 to be in its active low state and presents this signal to enable the decoder 16. Simultaneously, the microprocessor 20 presents an address on the address lines 12 which is also connected to the decoder 16. The address on lines 12 selects which output of the decoder 16 is to become active. The read decoder 16 presents an active low signal on line 20 when a particular address is presented. An active low signal on line 20 causes the flip flop 30 to be set. Upon setting the flip flop 30, the Q output on line 34 enables the enabling gate 28 and causes the enabling gate 28 to provide an enabling signal on line 36 which represents the signal on line 18. When the enabling gate 28 is enabled and there is an active enable signal is on line 18, the signal on line 36 enables the memory element 26 to be written into.

The microprocessor 10 initiates a write operation after setting the flip flop 30. The microprocessor 10 presents another specific address to the decoder 14. That specific address selects which output of decoder the 14 is to become active and in this instance, the active output is on line 18. Simultaneously, the microprocessor 10 presents an active low write control signal on line 22. An active low signal on line 22, with the specific address on address lines 12, causes the decoder 14 to present an active low signal on line 18. This active low signal on line 18 enters the enabling gate 28 that then enables the memory element 26. The data lines 38 transfer information into the memory element 26 from the microprocessor 10 thereby effectuating writing into the memory element 26.

Upon completion of this write operation, the microprocessor 10 presents an inactive high signal on line 22. The decoder 14 presents an inactive signal on line 18 upon the removal of the write signal on line 22. The enabling gate 28 thus presents an inactive signal on line 36. The memory element 26 is then disabled.

The flip flop 30 resets upon the presenting of an inactive signal on line 22. This reset condition causes the Q output on line 34 to go to a low state thereby disabling the enabling gate 28.

The flip flop 30 has its D input pin connected to ground voltage, the reset input connected to an active low power-on-reset signal on line 32, the set input connected to an active low output on line 20 of the decoder 16, the clock input connected to an active low write control signal on line 22 from microprocessor 10 and the Q output on line 34 is connected to the enabling gate 26. The enabling input of the decoder 16 is connected to active low read signal on line 20. The enabling input of decoder 14 is connected to the active low write signal on line 18. It then becomes apparent that the D flip flop is clocked-triggered upon the going inactive of the active low write signal on line 18.

The microprocessor 10 must execute a read instruction with the particular address prior to the writing to the memory element 26. The failure modes of microprocessors are somewhat predictable. By the insertion of the flip flop 30, the memory element 26 is protected from erroneously executing microprocessors. The microprocessor 10 must go through an ordered read-then-write sequence in order to write into the memory element 26. This read-then-write requirement provides the additional protection.

What is claimed is:

1. A memory protect system for protecting an area of critical data in an electronic memory against unauthorized read and write operations, comprising
   (a) memory means for recording whether read and write operations are authorized for the area of critical data;
   (b) means for altering said memory means to indicate that a fixed number of read and write operations are authorized for the area of critical data; and
   (c) means for preventing read and write operations to the area of critical data when said memory means does not indicate that read and write operations are authorized, by disabling an enable signal to cause operations on the area of critical data to not be performed.

* * * * *